US007908573B2

(12) United States Patent  (10) Patent No.: US 7,908,573 B2
Lin  (45) Date of Patent: Mar. 15, 2011

(54) MINIMIZING EFFECTS OF INTERCONNECT VARIATIONS IN INTEGRATED CIRCUIT DESIGNS

(75) Inventor: Xi-Wei Lin, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 125 days.

(21) Appl. No.: 12/505,357

(22) Filed: Jul. 17, 2009

(65) Prior Publication Data
US 2009/0319960 A1  Dec. 24, 2009

Related U.S. Application Data

(62) Division of application No. 11/767,292, filed on Jun. 22, 2007, now Pat. No. 7,669,161.

(51) Int. Cl.
*G06F 17/50* (2006.01)
(52) U.S. Cl. ............. 716/54; 716/56; 716/100; 716/132
(58) Field of Classification Search ........................ None
See application file for complete search history.

(56) References Cited

U.S. PATENT DOCUMENTS

| | | | |
|---|---|---|---|
| 4,827,428 | A | 5/1989 | Dunlop et al. |
| 4,904,569 | A | 2/1990 | Fukuda et al. |
| 5,293,216 | A | 3/1994 | Moslehi |
| 5,438,527 | A | 8/1995 | Feldbaumer et al. |
| 5,764,532 | A | 6/1998 | Patel |
| 5,974,244 | A | 10/1999 | Hayashi et al. |
| 6,014,505 | A | 1/2000 | Schorn |
| 6,169,968 | B1 | 1/2001 | Kabuo |
| 6,209,121 | B1 | 3/2001 | Goto |
| 6,209,122 | B1 | 3/2001 | Jyu et al. |
| 6,219,631 | B1 | 4/2001 | Oh et al. |

(Continued)

FOREIGN PATENT DOCUMENTS

JP  05198678 A  8/1993

(Continued)

OTHER PUBLICATIONS

Acar, E. et al., "A Linear-Centric Simulation Framework for Parametric Fluctions", 2002 Proceedings of Design, Automation and Test in EuropeConference and Exhibition, Mar. 4, 2002, pp. 1-8. cited by other.

(Continued)

*Primary Examiner* — Leigh Marie Garbowski
(74) *Attorney, Agent, or Firm* — Warren S. Wolfeld; Haynes Beffel & Wolfeld LLP

(57) ABSTRACT

Roughly described, method and apparatus for laying out an integrated circuit, in which a subject interconnect has predetermined values for a plurality of variables affecting propagation delay of the subject interconnect. The value of an adjustment one of the variables is adjusted to minimize exposure of the propagation delay of the interconnect to process variations causing variations in the value of a subject fabrication variable, and a revised layout is developed in dependence upon the adjusted value for the adjustment variable. In an embodiment, the adjustment is made in dependence upon a pre-calculated "interconnect optimization database" indicating combinations of values for the plurality of variables which have been pre-determined to minimize exposure of interconnect propagation delay to process variations affecting the subject variable. Different databases, or different entries in the same database, can be provided for minimizing exposure of interconnect propagation delay to process variations affecting each subject variable of interest.

28 Claims, 6 Drawing Sheets

U.S. PATENT DOCUMENTS

| | | | |
|---|---|---|---|
| 6,306,769 | B1 | 10/2001 | Subramanian et al. |
| 6,378,109 | B1 | 4/2002 | Young et al. |
| 6,425,110 | B1 | 7/2002 | Hathaway et al. |
| 6,507,936 | B2 | 1/2003 | Yamaguchi |
| 6,553,338 | B1 | 4/2003 | Buch et al. |
| 6,618,837 | B1 | 9/2003 | Zhang et al. |
| 6,904,572 | B2 | 6/2005 | Igarashi |
| 6,990,651 | B2 | 1/2006 | Balasubramanian et al. |
| 7,076,746 | B2 * | 7/2006 | Hamlin et al. ............... 716/52 |
| 7,216,320 | B2 | 5/2007 | Chang et al. |
| 7,360,191 | B2 | 4/2008 | Chang et al. |
| 7,383,521 | B2 | 6/2008 | Smith et al. |
| 7,475,382 | B2 | 1/2009 | Melvin, III et al. |
| 7,594,210 | B2 * | 9/2009 | Becer et al. ............... 716/119 |
| 7,739,095 | B2 * | 6/2010 | Lin et al. ............... 703/14 |
| 2002/0196629 | A1 | 12/2002 | Terashi |
| 2003/0167451 | A1 | 9/2003 | Igarashi |
| 2003/0204817 | A1 * | 10/2003 | Kashyap ............... 716/1 |
| 2003/0229412 | A1 | 12/2003 | White et al. |
| 2003/0229868 | A1 | 12/2003 | White et al. |
| 2004/0010764 | A1 | 1/2004 | Zhang et al. |
| 2004/0052411 | A1 | 3/2004 | Qian et al. |
| 2004/0170905 | A1 | 9/2004 | Liebmann et al. |
| 2004/0172609 | A1 | 9/2004 | Hassibi et al. |
| 2004/0210863 | A1 | 10/2004 | Culp et al. |
| 2004/0243964 | A1 | 12/2004 | McElvain et al. |
| 2004/0254776 | A1 * | 12/2004 | Andou ............... 703/19 |
| 2005/0027501 | A1 | 2/2005 | Chen et al. |
| 2005/0034087 | A1 | 2/2005 | Hamlin et al. |
| 2005/0108666 | A1 | 5/2005 | Chang et al. |
| 2005/0172251 | A1 | 8/2005 | Chang et al. |
| 2006/0015834 | A1 | 1/2006 | Amekawa |
| 2007/0226671 | A1 | 9/2007 | Hirata |
| 2008/0228460 | A1 | 9/2008 | Lin et al. |
| 2008/0320422 | A1 | 12/2008 | Cazeaux |

FOREIGN PATENT DOCUMENTS

| | | |
|---|---|---|
| JP | 06149925 A | 5/1994 |
| JP | 07056976 A | 3/1995 |
| JP | 09006831 A | 1/1997 |
| JP | 2003076737 A | 3/2003 |

OTHER PUBLICATIONS

Anne, P. et al., "Comparative Analysis of New CMOS Leaf Cells for OTC Routing", IEEE International Symposium on Circuits and Systems, May 30, 1994, vol. 4, pp. 191-194. cited by other.

Dai, W. et al., "Timing Analysis Taking into Account Interconnect Process Variation", IEEE International Workshop on Statistical Methodology, Jun. 10, 2001, pp. 51-53. cited by other.

Xue, T. et al., "Sensitivity-Based Wiresizing Approach to Interconnect Optimization of Lossy Transmission Line Topologies", 1996 IEEE Multi-Chip Module Conference, Feb. 6, 1996, pp. 117-122. cited by other.

Office Action mailed May 8, 2009 in U.S. Appl. No. 11/767,292.

Response filed Aug. 10, 2009 to Office Action mailed May 8, 2009 in U.S. Appl. No. 11/767,292.

* cited by examiner

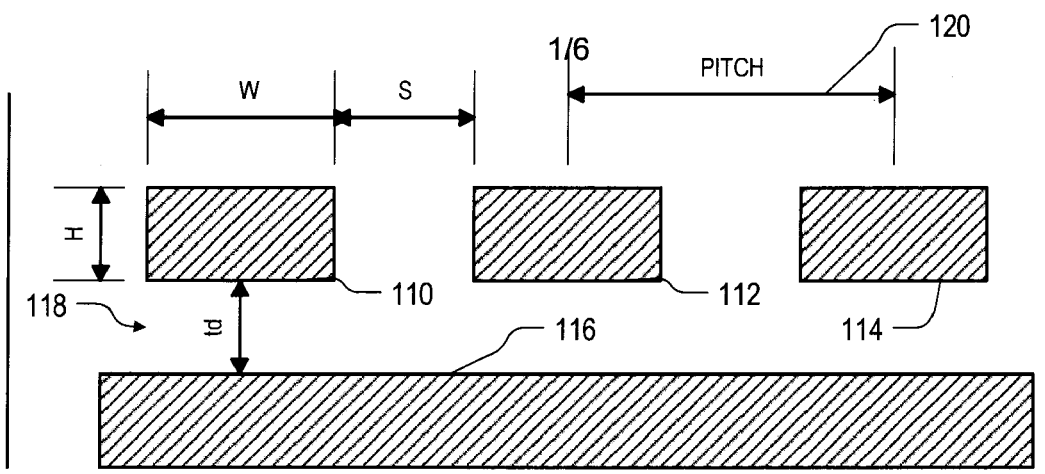
FIG. 1A (NOMINAL)
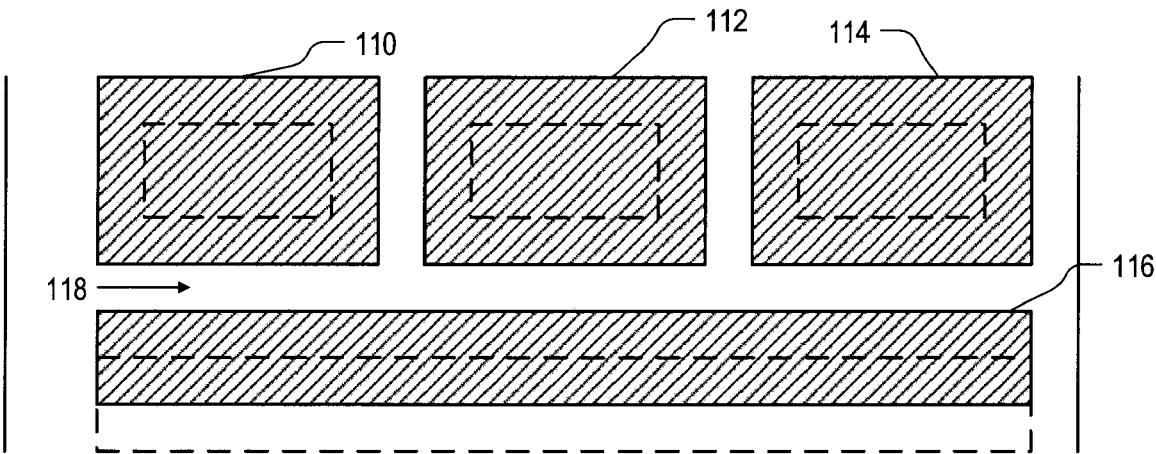
FIG. 1B ("WORST" (LARGEST) CAPACITANCE)
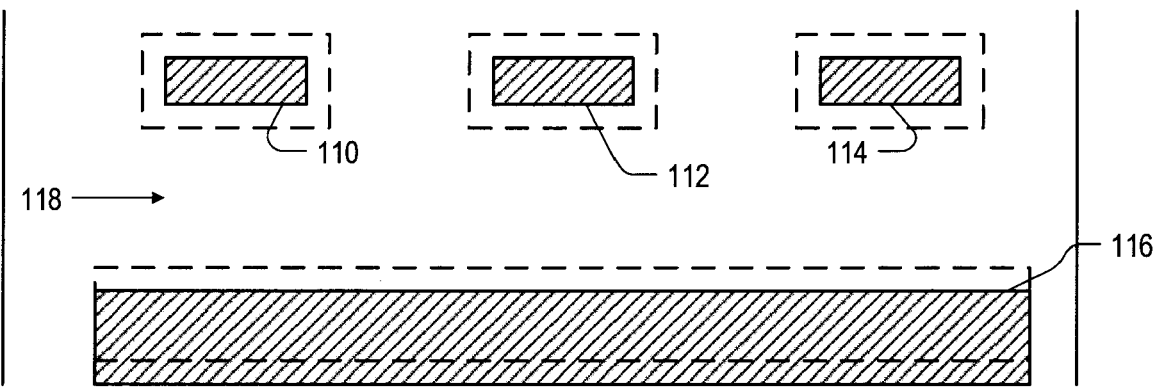
FIG. 1C – "BEST" (SMALLEST) CAPACITANCE

MINIMIZING EFFECTS OF INTERCONNECT VARIATIONS IN INTEGRATED CIRCUIT DESIGNS

RELATED APPLICATIONS

This application is a divisional of co-pending U.S. application Ser. No. 11/767,292 filed 22 Jun. 2007, herein incorporated by reference.

BACKGROUND

The present invention relates to integrated circuit layout techniques, and in particular to techniques and supporting systems and databases for minimizing the effect of process variations on interconnect signal propagation delays.

In the design and fabrication of integrated circuit devices, it is often important to know with significant precision what the signal propagation delay will be from the output of each source node to the input of each destination node. Circuits are often designed assuming particular nominal propagation delay times, or particular nominal propagation delay times are sometimes designed into a circuit to meet certain design goals. Overall it is of course desirable that fabrication technologies be developed which minimize propagation delays, but once the nominal propagation delay is known for a particular interconnect, it is becoming increasingly important that it not vary significantly from that value. This is true especially in such parts of the design as clock distribution trees and critical signal paths. Precise knowledge of the propagation delays is important because too large an increase in a propagation delay might cause a signal asserted at the source node to reach the destination node too late to be stable in time to meet the setup time requirement of the destination node, and too large a decrease in the propagation delay might cause a signal release at the source node to reach the destination node before the end of the hold time requirement of the destination node.

Unfortunately, as device feature sizes shrink into nanometer scale, process variations in semiconductor manufacturing can significantly affect signal propagation delays. It has been found that the metal wire cross-section (height and width), as well as the spacing between adjacent metal lines, may vary by more than 10% from location to location on a single wafer and from wafer to wafer, leading to more than 20% fluctuation in resistance (R) and capacitance (C) relative to their nominal values. The values of R and C for an interconnect largely determine signal propagation times, so the uncertainty in R and C results in uncertainty in the propagation time. A product therefore may fail in timing if the large uncertainty in R and C is not properly managed when designing or laying out a circuit.

One common practice to accommodate such uncertainties is to over-design a product by adding timing margins, at the expense of cost and speed. This approach is increasingly difficult to work, as clock frequencies increase, taking away the available budget for the timing margins.

Accordingly, as fabrication processes continue to enable smaller and faster devices, the probability of device failures due to process uncertainties is becoming increasingly significant. Efforts may be made to improve process consistency, but consistency can never be perfect, and uncertainties will always exist at the margins where the highest performance devices are being designed. A need therefore exists for better managing the effects of inevitable process variations on signal propagation delays in the circuit.

SUMMARY

Roughly described, the invention involves a method for laying out an integrated circuit, in which a subject interconnect has predetermined values for a plurality of variables affecting propagation delay of the subject interconnect. The value of one of the variables (sometimes referred to herein as an "adjustment" one of the variables, or merely an "adjustment variable") is adjusted to minimize exposure of the propagation delay of the interconnect to process variations causing variations in the value of a subject fabrication variable, and a revised layout is developed in dependence upon the adjusted value for the adjustment variable.

The variables can include such factors as a cross-sectional nominal height for the subject interconnect, a cross-sectional nominal width, effective spacing to nearby laterally adjacent conductors, metal utilization within a window covering the interconnect, metal utilization and distance to center-of-gravity of a metal layer adjacent to a layer containing the subject interconnect, an effective length of the subject interconnect, output resistance of a driver driving the subject interconnect, and input capacitance of a receiver connected to the subject interconnect.

Preferably but not necessarily, the adjustment is made in dependence upon a pre-calculated "interconnect optimization database" indicating combinations of values for the plurality of variables which have been predetermined to minimize exposure of interconnect propagation delay to process variations affecting the subject variable. Different databases, or different entries in the same database, can be provided for minimizing exposure of interconnect propagation delay to process variations affecting each subject variable of interest.

BRIEF DESCRIPTION OF THE DRAWINGS

The invention will be described with respect to particular embodiments thereof, and reference will be made to the drawings, in which:

FIGS. 1A, 1B and 1C are symbolic diagrams of a portion of an integrated circuit device fabricated under nominal, worst and best capacitance case process conditions, respectively.

DETAILED DESCRIPTION

Figure 2:
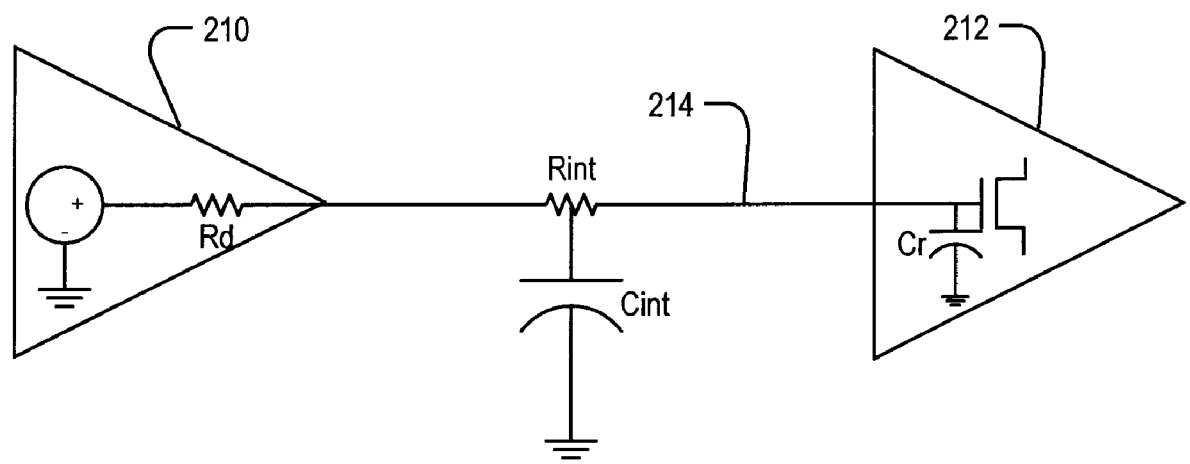
FIG. 2 illustrates a circuit model of an interconnect for purposes of calculating a propagation delay.

The following detailed description is made with reference to the figures. Preferred embodiments are described to illustrate the present invention, not to limit its scope, which is defined by the claims. Those of ordinary skill in the art will recognize a variety of equivalent variations on the description that follows.

FIG. 1A is a symbolic diagram of a portion of an integrated circuit device. Shown are three metal conductors 110, 112 and 114, extending into the plane of the page and viewed in cross-section, and a fourth conductor or ground plane 116 located in a layer below and separated by a dielectric layer 118. For this illustration, the conductors 110, 112 and 114 have a pitch 120. They all have a width w, a thickness h, and are spaced from each other by a distance s. The conductors 110, 112 and 114 are all separated from the underlying layer 116 by spacing td. FIG. 1A may illustrate the geometric characteristics of a device fabricated exactly as specified in the layout file. It is referred to herein as the "nominal" case, or a "typical" case. But fabrication processes often produce actual devices which differ somewhat from the nominal geometries, some of which turn out to have smaller or larger values for the distances h, w, s and td. The capacitances of the metal conductors 110, 112 and 114 in such cases, therefore can be either greater or less than the capacitances for the nominal case of FIG. 1A.

FIG. 1B, for example, shows a variation that is usually considered to be the "worst" case for the capacitance of conductors 110, 112 and 114. In this figure the nominal geometry from FIG. 1A is illustrated with dashed lines and the geometry as actually fabricated is illustrated with a solid lines. It can be seen that the conductors are enlarged in cross-section, in both height and width, thereby reducing the spacing between them and increasing the area (parallel vertical walls) acting in a parallel-plate capacitive manner. The lower surface of the conductors 110, 112 and 114 acting in a parallel-plate capacitive manner with the underlying layer 116, is also wider than the nominal. Additionally, the dielectric 118 is also thinner in this variation, which reduces the spacing td between the conductors 110, 112 and 114 and the underlying layer 116. All of these changes serve to increase the capacitance in the conductors 110, 112 and 114 to a "worst case" capacitance. The variations in w and h also serve to decrease the resistance in the conductors 110, 112 and 114, to a "best case" resistance.

As an opposite case, FIG. 1C shows a variation that is usually considered to be the "best" case for the capacitance of conductors 110, 112 and 114. As with FIG. 1B, in FIG. 1C the nominal geometry from FIG. 1A is illustrated with dashed lines and the geometry as actually fabricated is illustrated with a solid lines. It can be seen that the conductors are narrowed in cross-section, in both height and width, thereby increasing the spacing between them and decreasing the area (parallel vertical walls) acting in a parallel-plate capacitive manner between them. The lower surface of the conductors 110, 112 and 114 acting in a parallel-plate capacitive manner with the underlying layer 116, is narrower than the nominal. Additionally, the dielectric 118 is thicker in this variation, which increases the spacing td between the conductors 110, 112 and 114 and the underlying layer 116. All of these changes serve to decrease the capacitance in the conductors 110, 112 and 114 to a "best case" capacitance. The variations in w and h also serve to increase the resistance in the conductors 110, 112 and 114, to a "worst case" resistance.

It can be seen that the metal resistance $R_{int}$ and capacitance $C_{int}$ is a function of several interconnect geometrical parameters, primarily metal width w, metal height h, intra-metal spacing s in the same layer, and inter-metal spacing across metal layers td, in addition to the wire length L. Roughly, one has:

$$R_{int} = r_{int}(w,h,s) \cdot L \text{ and } C_{int} = c_{int}(w,h,s,td) \cdot L,$$

where $r_{int}$ and $c_{int}$ are the resistance and capacitance per unit length, respectively. In general, the variation of $r_{int}$ and $c_{int}$ are strongly correlated: an increase in $r_{int}$ causes a decrease in $c_{int}$, or vice versa, as the metal width or height varies. In other words, $r_{int}$ and $c_{int}$ tend to change in the opposite direction. Other layout and process factors can affect resistance and capacitance as well, such as the shape of the metal cross-section (which may not necessarily be rectangular); other parameters, such as side-wall slope, may be used to describe the shape more accurately. The metal shape can also be dependent on metal density around the location of interest, both in the same metal layer and in adjacent metal layers above and below. The materials and their uniformity for metal and dielectrics also can affect resistance and capacitance, as well as their relation to geometric parameter changes. A much more general set of formulas for $R_{int}$ and $C_{int}$ can be developed which take these and other factors into account as well.

A typical semiconductor circuit includes one or more drivers driving an interconnect network on one end and one or more receiving devices on the other end. Multiple receivers occur in branching circuits, for example, and multiple drivers occur in "wire-AND" circuits, for example. An "interconnect", as used herein, is a signal path from one driver output to one receiver input. The term "net" is used interchangeably herein with "interconnect". Note that the total capacitance of such an interconnect depends on the entire metal area of all branches, whereas the total resistance of such an interconnect does not.

FIG. 2 illustrates a circuit model of an interconnect for purposes of calculating a propagation delay. It comprises a source driver 210 having an output resistance Rd, a receiver device 212 having an input gate capacitance Cr, and the interconnect conductor itself 214 having resistance $R_{int}$ and a capacitance $C_{int}$. The values of $R_{int}$ and $C_{int}$ are roughly proportional to the length L of the interconnect (assuming no branching), but Rd and Cr are constant for different lengths L. The propagation delay Tpd from the input of the driver to the input of a receiver is a function of Rd, Cr, $R_{int}$, and $C_{int}$, that is:

$$Tpd = f(Rd, Cr, R_{int}, C_{int}) \quad (\text{eq. 1})$$

The typical variables used in a design implementation process are the driver strength (corresponding to Rd), receiver input capacitance Cr, metal width w, metal spacing s, and interconnect length L (through device placement) from the driver to the receiver. Variations in $R_{int}$ and $C_{int}$ correspond to manufacturing deviations of interconnect geometries from their nominal values.

Mathematically, the effect of manufacturing variations which affect a particular subject variable, on the propagation delay Tpd, will be minimized in magnitude or eliminated if the interconnect can be designed with a combination of variables which yield a zero or minimum derivative of Tpd, that is:

$$\partial Tpd/\partial x|_{x=x_0} = 0 \quad (\text{eq. 2})$$

or the magnitude of $\partial Tpd/\partial x|_{x=x_0}$ is a minimum $\quad (\text{eq. 3})$ where x stands for any one or multiple of the above mentioned factors or parameters, including w, h, s, td, metal cross-sectional area a, L, Rd, Cr, and x0 for nominal values. Because $R_{int}$ and $C_{int}$ are correlated and their responses to a parameter variation are in opposite directions, typically it is possible to find conditions to satisfy eq. 2 or eq. 3.

The function $Tpd = f(Rd, Cr, R_{int}, C_{int})$ can be derived either through simulations and built in the format of a database, or through analytical modeling. Either way, the algorithms involve evaluating the derivatives of Tpd against a desired subject parameter to find the minimum or zero point of the derivative. In other words, for each driver and receiver pair with interconnects in between, $\partial Tpd/\partial x$ can be computed to find a set of values for metal width, metal spacing, metal length, driver placement, receiver placement, and so on, such that the derivative equals zero or reaches a minimal value. The new values then are used to update the layout or netlist so the design is optimal against process variations affecting each variable of interest.

In a more simplified embodiment, the following function is used as an approximation for Tpd:

$$Tpd = e1 \cdot Rd \cdot Cr + e2 \cdot Rd \cdot c_{int} \cdot L + e3 \cdot r_{int} \cdot Cr \cdot L + e4 \cdot r_{int} \cdot c_{int} \cdot L^2 \quad \text{(eq. 4)}$$

where e1, e2, e3, and e4 are coefficients of their respective terms. Note that the length L in eq. 4 is considered as the shortest wire length from the driver to the receiver, if there is branching of the metal wires. (Note that as used herein, the terms "estimate" and "approximation" include exactness as a special case. Other approximations for Tpd can be used in other embodiments.)

To illustrate the procedure of optimizing a design against interconnect variations, assume the metal width is the variable around a set of nominal conditions: w0, s0, h0, td0, L0. Taking derivative of Tpd in eq. 4 against w gives:

$$\partial Tpd/\partial w = [(e2 \cdot Rd/L + e4 \cdot r_{int})(\partial c_{int}/\partial w) + (e3 \cdot Cr/L + e4 \cdot c_{int})(\partial r_{int}/\partial w)]L^2 \quad \text{(eq. 5)}$$

If $\partial Tpd/\partial w = 0$, the variation of Tpd around w0 reaches a minimum. Based on eq. 5, this means that a solution exists for the following equation:

$$\frac{(e2/e4) \cdot (Rd/L) + r_{int}}{(e3/e4) \cdot (Cr/L) + c_{int}} = -\frac{\partial r_{int}/\partial w}{\partial c_{int}/\partial w} \quad \text{(eq. 6)}$$

Notice the negative sign on the right side of equation. Since $r_{int}$ and $c_{int}$ change in opposite directions with w, the term on the right side of eq. 6 is always positive. As a result, it is possible to find a set of conditions to satisfy equation 6, leading to $\partial Tpd/\partial w = 0$. Such a set of conditions is the right combination of the nominal values of metal width w0, spacing s0, length L, driver impedance Rd, or receiver load Cr to minimize the exposure of the propagation delay of the interconnect, to process variations affecting interconnect width w.

Notice further that eq. 6 depends on the ratio Rd/L. This means that once the right hand side of eq. 6 has been calculated, then as long as the ratio Rd/L remains constant, eq. 6 will remain valid. Thus, for a given Rd, one can always find a value of L which satisfies eq. 6; or for a given L, one can always find a value of Rd which satisfies eq. 6. This equation therefore provides the flexibility for optimization of other circuit properties such as timing, physical density, and signal integrity, while still making it possible to minimize or eliminate the timing fluctuation due to process variations affecting interconnect width w.

Eq. 6 can be generalized for use in minimizing the exposure of the propagation delay of the interconnect, to process variations affecting any variable x which can affect propagation delay, simply by substituting x for w in eq. 6 as follows:

$$\frac{(e2/e4) \cdot (Rd/L) + r_{int}}{(e3/e4) \cdot (Cr/L) + c_{int}} = -\frac{\partial r_{int}/\partial x}{\partial c_{int}/\partial x} \quad \text{(eq. 6a)}$$

An alternative form of eq. 6 is as follows:

$$\frac{(e2/e4) \cdot (Rd/R_{int}) + 1}{(e3/e4) \cdot (Cr/C_{int}) + 1} = -\frac{\partial \ln(r_{int})/\partial w}{\partial \ln(c_{int})/\partial w} \quad \text{(eq. 7)}$$

The right hand side of equation 7 is a ratio of $\ln(r_{int})$ to $\ln(c_{int})$ derivatives, while the left hand side simply depends on the ratio of driver resistance Rd to the total interconnect resistance $R_{int}$, and the ratio of the receiver capacitance Cr to the total interconnect capacitance $C_{int}$. If the right hand side of eq. 7 is treated as a function $f_{int}$ of interconnect geometries, that is $$f_{int}(w, h, s, td) = -\frac{\partial \ln(r_{int})/\partial w}{\partial \ln(c_{int})/\partial w},$$

then a database can be pre-built relating $f_{int}$ to manufacturing inputs and parasitic extraction of various cross-sectional interconnect configurations (patterns). The values of layout variables can then be adjusted to minimize the exposure of propagation delay of each subject interconnect, to fluctuations due to process variations affecting interconnect width w, by adjusting metal width, spacing, Rd and/or Cr, as needed to satisfy the eq. 7.

Again, eq. 7 can be generalized for use in minimizing the exposure of the propagation delay of the interconnect, to process variations affecting any variable x which can affect propagation delay, simply by substituting x for w in eq. 7 as follows:

$$\frac{(e2/e4) \cdot (Rd/R_{int}) + 1}{(e3/e4) \cdot (Cr/C_{int}) + 1} = -\frac{\partial \ln(r_{int})/\partial x}{\partial \ln(c_{int})/\partial x} \quad \text{(eq. 7a)}$$

The above techniques further can be extended to obtain even greater reduction in delay sensitivity to process variations, by also setting higher order derivatives of Tpd equal to zero for a set of geometries. This can be expressed as follows:

$$\partial Tpd/\partial x|_{x=x_0} 0, \partial^2 Tpd/\partial x^2|_{x=x_0} = 0, \ldots, \text{ and } \partial^n Tpd/\partial x^n|_{x=x_0} = 0, \quad \text{(eq. set 8)}$$

for some value of n>1. As an illustration, we consider the case of n=2 and derive the conditions for determining the optimal geometry w0 (nominal interconnect width). Specifically, one has:

$$\partial Tpd/\partial x|_{x=x_0} = 0 \quad \text{(eq. 9.1)}$$

$$\partial^2 Tpd/\partial x^2|_{x=x_0} = 0 \quad \text{(eq. 9.2)}$$

Based on eqs. 5 and 9.2, one has:

$$[(e2/e4) \cdot (Rd/R_{int}) + 1](\partial^2 c_{int}/\partial w^2) \cdot ri + [(e3/e4) \cdot (Cr/C_{int}) + 1](\partial^2 r_{int}/\partial w^2) \cdot c_{int} = -2(\partial r_{int}/\partial w)(\partial c_{int}/\partial w) \quad \text{(eq. 10)}$$

For an interconnect dominant circuit, the ratio $Cr/C_{int}$ is small and can be ignored. Combining with eq. 7, it follows:

$$\frac{\partial \ln(r_{int})/\partial w}{\partial \ln(c_{int})/\partial w} \cdot \frac{\partial^2 c_{int}/\partial w^2}{c_{int}} - \frac{\partial^2 r_{int}/\partial w^2}{r_{int}} = \quad \text{(eq. 11)}$$

$$2[\partial \ln(r_{int})/\partial w] \cdot [(\partial \ln(c_{int})/\partial w)]$$

As with eqs. 6 and 7, eq. 11 can be generalized for use in minimize the exposure of the propagation delay of the interconnect, to process variations affecting any variable x which can affect propagation delay, simply by substituting x for w in eq. 7 as follows:

$$\frac{\partial \ln(r_{int})/\partial x}{\partial \ln(c_{int})/\partial x} \cdot \frac{\partial^2 c_{int}/\partial x^2}{c_{int}} - \frac{\partial^2 r_{int}/\partial x^2}{r_{int}} = \quad \text{(eq. 11a)}$$

$$2[\partial \ln(r_{int})/\partial x] \cdot [(\partial \ln(c_{int})/\partial x)]$$

This condition depends only on the interconnect cross-section and material properties ($r_{int}$ and $c_{int}$). Therefore, a solution can be searched, independent of the design specifics, such as driver strength and receiver input capacitance. In other words, the solution is process technology specific and need only be found once for all designs using the same process technology. If the solution exists, a database can be built in advance to enable design optimization.

Given the above background, a method can now be constructed for optimizing the immunity to timing variations that each desired interconnect in a circuit design has against process variations. In addition, though not a requirement of the optimization method, an interconnect optimization database can be constructed in advance that can be used by this optimization method.

Overall Method

Figure 3:
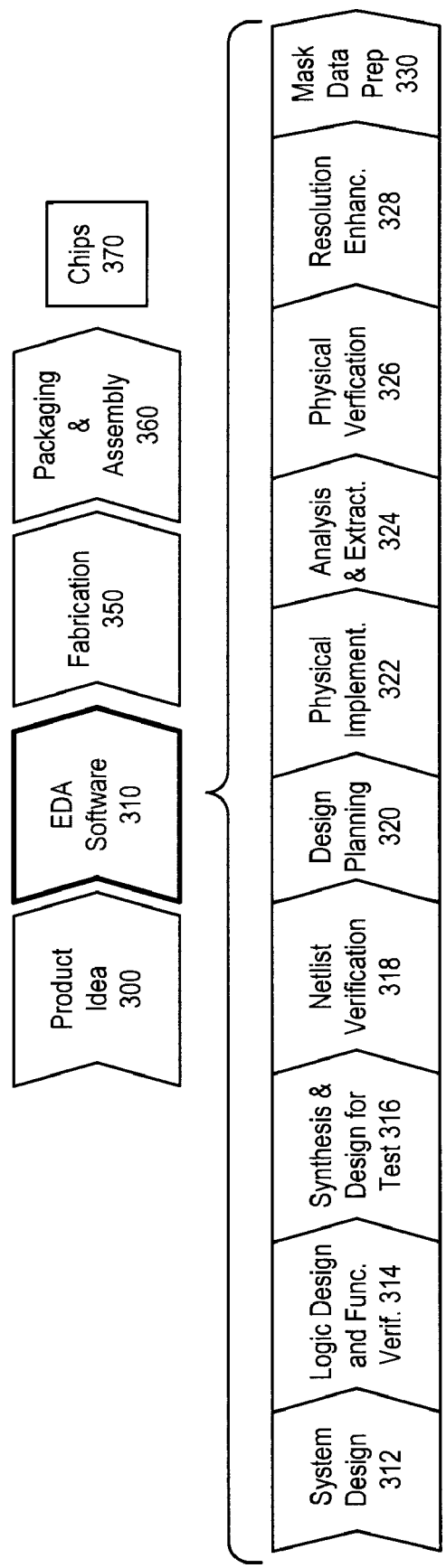
FIGS. 3, 4 and 5 are flow charts of an illustrative digital integrated circuit design flow incorporating the invention.

FIG. 3 shows a simplified representation of an illustrative digital integrated circuit design flow. At a high level, the process starts with the product idea (step 300) and is realized in an EDA (Electronic Design Automation) software design process (step 310). When the design is finalized, the fabrication process (step 350) and packaging and assembly processes (step 360) occur resulting, ultimately, in finished integrated circuit chips (result 370).

The EDA software design process (step 310) is actually composed of a number of steps 312-330, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 310) will now be provided.

System design (step 312): The designers describe the functionality that they want to implement, they can perform what if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 314): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 316): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 318): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 320): Here, an overall floor plan for the chip is constructed and analyzed for timing and top level routing. Example EDA software products from Synopsys, Inc. that can be used at this step include Astro and IC Compiler products.

Physical implementation (step 322): The placement (positioning of circuit elements) and routing (connection of the same) occurs at this step. Example EDA software products from Synopsys, Inc. that can be used at this step include the Astro and IC Compiler products.

Analysis and extraction (step 324): At this step, the circuit function is verified at a transistor level, this in turn permits what if refinement. Example EDA software products from Synopsys, Inc. that can be used at this step include AstroRail, PrimeRail, Primetime, Star RCXT, HSPICE and HSIM products. Certain aspects of the invention can be applied during this step.

Physical verification (step 326): At this step various checking functions are performed to ensure correctness for: manufacturing, electrical issues, lithographic issues, and circuitry. Example EDA software products from Synopsys, Inc. that can be used at this step include the Hercules product. Certain aspects of the invention can be take place during this step as well.

Resolution enhancement (step 328): This step involves geometric manipulations of the layout to improve manufacturability of the design. Example EDA software products from Synopsys, Inc. that can be used at this step include Proteus, ProteusAF, and PSMGen products.

Mask data preparation (step 330): This step provides the data for production of masks for lithographic use to produce finished chips. Example EDA software products from Synopsys, Inc. that can be used at this step include the CATS(R) family of products.

Optimization Method

Figure 4:
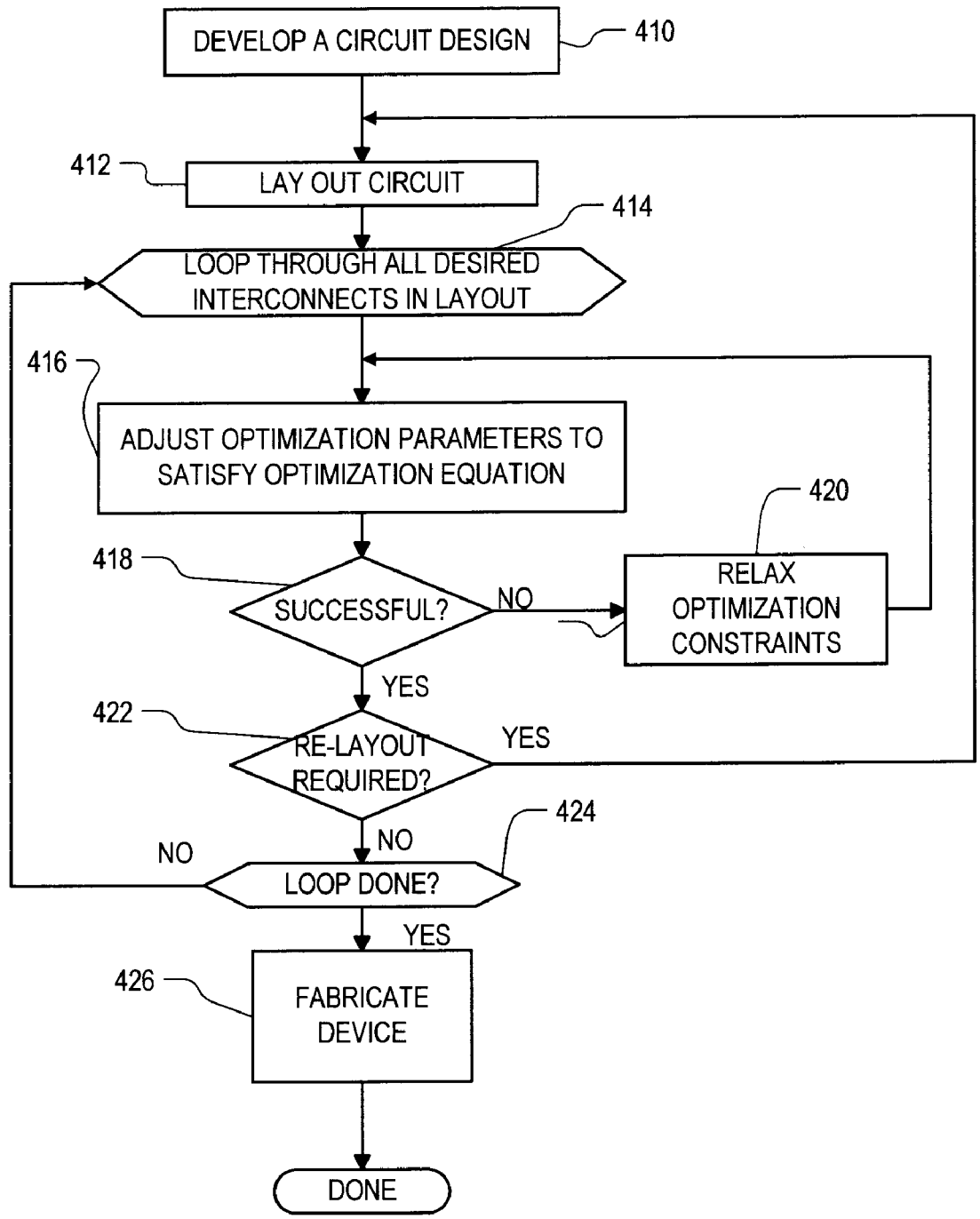

FIG. 4 is another flow chart of the example method, focusing more closely on steps that include aspects of the invention. As with all flowcharts herein, it will be appreciated that many of the steps can be combined, performed in parallel or pipelined or performed in a different sequence without affecting the functions achieved. In some cases the reader will appreciate that a re-arrangement of steps will achieve the same results only if certain other changes are made as well, and in other cases the reader will appreciate that a re-arrangement of steps will achieve the same results only if certain conditions are satisfied.

In step 410, a circuit design is developed. As used herein, a "circuit design" is a gate level design, after synthesis from VHDL or equivalent and before layout. Typically a design is represented in a file or database of some kind, and includes a "netlist", which is a listing of all the devices used in the circuit design and the interconnects among them. In step 412, the circuit design is laid out into a preliminary layout. It will be understood that the layout need not be of a complete circuit design, for example if only a portion of the circuit is to be addressed at this time. The layout is typically represented in another standard format file or database, for example using the standard GDSII format.

Among other things, the layout file specifies values that can affect the propagation delay of an interconnect. Quite a few variables can affect the propagation delay of an interconnect and may be included in the layout file. These include the length L of the interconnect, the output resistance Rd of the driver driving the interconnect, and the input capacitance Cr of the receiver connected to receive a signal from the interconnect. (There may be more than one receiver connected electrically to a particular interconnect, such as in a branching configuration, and more than one driver driving it, such as in a wire-AND configuration; but as mentioned previously, a particular interconnect is defined herein by only one driver and only one receiver.) The length L of the interconnect is sometimes referred to herein as a "layout variable", since it receives a value only during layout. Typically it is not specified in the circuit design stage. Rd and Cr, on the other hand, are considered herein to be "circuit variables", since these are (or can be) given values during the circuit design stage. Typically they are given values by selecting one of a plurality of available drivers and receivers made available to the designer by the standard cell or IP library vendor. Other variables that can affect propagation delay are those that can affect either the capacitance per unit length, $c_{int}$, or the resistance per unit length, $r_{int}$, of an interconnect. These include such variables as nominal metal cross-sectional area (usually given by nominal height and width), information about laterally adjacent wires, (for example effective spacing to the nearest conductors on either side laterally), metal utilization within a predetermined window covering the particular wire (affects the actual height of the interconnect due to its affect on the differential rate of chemical etching and polishing in the region), information about nearby wires on other layers (for example metal utilization and diagonal distance to center-of-gravity of the metal utilization, for each of up to two metal layers above and below the layer of the particular interconnect), and possibly other fine tuning variables as well. These are all considered herein to be "layout variables", since like the length L of the interconnect, they receive values only during layout.

Preferably the layout file identifies values for at least two, and even more preferably all, of the following variables for each particular interconnect in the layout: a cross-sectional nominal height for the particular interconnect, a cross-sectional nominal width for the particular interconnect, effective spacings of the particular interconnect to its nearest conductors laterally adjacent on both sides of the particular interconnect, metal utilization within a predetermined window covering the particular interconnect, metal utilization and (optionally) distance to center-of-gravity of one or more metal layers immediately above and below the layer containing the particular interconnect, an effective length of the particular interconnect, output resistance of a driver driving the particular interconnect, and input capacitance of a receiver connected to the particular interconnect.

Note that some variables above, such as height, width and length, are considered herein to have only nominal values, since process conditions can vary them. In addition, as used herein, the "identification" of a value does not necessarily require the direct specification of that value. A value can be "identified" for a variable or parameter by referring to the actual value through one or more layers of indirection (e.g. by specifying an index into a table which must be referenced to obtain the actual values), or by identifying one or more items of different information which are together sufficient to determine the actual value. The term "indicate" is used herein to mean the same as "identify". As an example, the nominal height for a particular interconnect may be "indicated" by reference to a metal layer number, rather than by being specified directly.

In step 414, a loop is begun through all interconnects in the layout for which optimization is desired. The particular interconnects that are analyzed in this step are extracted from the netlist, but in a particular embodiment might not include all interconnects represented in the netlist. For example, the operator might decide for a particular embodiment to optimize only the clock distribution trees, or all the interconnects in only a particular region of the layout, or only the interconnects that are part of a critical path in the circuit.

In step 416, the values for one or more "adjustment" variables affecting propagation delay of the current ("subject") interconnect, are adjusted to minimize exposure of the propagation delay of the subject interconnect to process variations causing variations in the value of one or more "subject" variable (also sometimes referred to herein as "optimization variables"). For example, if the adjustment variable is the cross-sectional nominal height of the interconnect, this value might be adjusted by moving the interconnect to a different metal layer. As another example, if the adjustment variable is the interconnect cross-sectional nominal width, then the nominal width might be increased or decreased.

As another example, if the adjustment variable is the effective spacing of the subject interconnect to a nearby conductor laterally adjacent on one side of the subject interconnect, the subject interconnect might be moved either toward or away from the nearby conductor. Note that the operator may be restricted by external constraints from fully optimizing certain variables, in which case the adjustment of step 416 is made as nearly as possible to the fully optimum value. Spacing, for example, is often constrained by a requirement that conductors always lie within predefined tracks. Such constrained optimizations are nevertheless still considered herein to "optimize" the propagation delay of an interconnect against fabrication process variations.

As yet another example if the adjustment variable is the effective length of the subject interconnect, this value might be adjusted by re-locating, in the layout, either the driver or the receiver or both. If the adjustment variable is the output resistance of a driver driving the subject interconnect, this value might be adjusted by selecting a different driver from the set of available drivers for driving the subject interconnect. Similarly, if the adjustment variable is the input capacitance of a receiver connected to the subject interconnect, this value might be adjusted by selecting a different receiver from the set of available receivers for connecting to the subject interconnect.

Note that the "subject" variable, process variations in which the above adjustments are protecting against, typically is, but need not be, among the variables whose values are indicated in the layout file. Nor is it necessary that the subject variable be one of the variables adjusted. Also, the step 416 of adjusting the values of adjustment variables can be performed for multiple subject variables simultaneously in certain embodiments. That is, the effect on propagation delay of an interconnect can be minimized against fabrication process variations in the value of more than one subject variable at the same time. In some cases the optimization for one variable will constrain the optimization for another variable; in this case any cooperative optimization algorithm or criteria can be used. Many cooperative optimization algorithms are well-known.

Preferably, the optimization step 416 can be performed by reference to a pre-defined interconnect optimization database described hereinafter. In other embodiments, any method can be used which chooses values for the adjustment variable(s) for which $\partial Tpd/\partial x|x=x_0$ is a minimum, or more preferably zero, where x is the subject variable. Tpd can be approximated in such an embodiment by eq. 4 above, for example, where the preliminary layout indicates values for variables which affect the capacitance per unit length of the subject interconnect, variables which affect the resistance per unit length of the subject interconnect, the effective length of the subject interconnect, the driver output resistance driving the interconnect, and the receiver input capacitance of the interconnect.

In one embodiment, the optimization step 416 is performed by choosing values for the adjustment variables which satisfy eq. 6a above, where x is the subject variable, variations in which are to be protected against. In another embodiment, the optimization step 416 is performed by choosing values for the adjustment variables which satisfy eq. 7a above. In yet another embodiment, the optimization step 416 is performed by choosing values for the adjustment variables which satisfy eq. set 8 above, for some integer n>1.

In step 418, it is determined whether a sufficiently optimal value was found for the subject variable. If not, then it might be possible to find such a value by relaxing one or more optimization constraints. In this case the optimization constraints are relaxed (step 420) and optimization is attempted again (step 416). For example, if optimization in step 416 was attempted in which both the first and second order derivatives of the approximate propagation delay function were required to equal zero (eq. set 8, with n=2), and no solution was found, then the step 420 might involve reducing n to 1, thereby simplifying the problem to one like eq. 6a or 7a. As another example, if optimization in step 416 was attempted against the values of several variables simultaneously, then the step 420 might involve reducing the number of subject variables against which optimization is required.

It will be appreciated that adjustments in the values of certain variables may require that part or all of the circuit design undergo layout again. This may be the case, for example, if the adjustment required selection of a different driver or receiver, movement of a driver or receiver or both in order to effect an adjusted interconnect length, or relocation of an interconnect to a different metal layer. In step 422, therefore, it is determined whether the adjustment made in step 416 requires re-layout of all or part of the circuit design. If it does, then the process returns to step 412 to lay out the appropriate parts of the circuit design again.

If no re-layout is required, then in step 424 it is determined whether all desired interconnects have been addressed. If not, then the process returns to step 414 to optimize the next interconnect. If so, then a revised layout file is created which includes the optimizations performed in step 416. The revised layout file constitutes an output of the described method. In addition, preferably it is further processed in accordance with the remaining steps of FIG. 3, and resulting information, for example in the form of fabrication masks or another form of data file, are provided to a fabrication facility for use in the fabrication of an actual device (step 426) from the layout.

Interconnect Optimization Database and its Use

As mentioned, a preferred way to perform the optimization step 416 is through the use of a predefined interconnect optimization database. The possibility of using a predefined database derives from the observation, mentioned above, that the right hand side of these equations is simply a ratio of $\ln(r_{int})$ to $\ln(c_{int})$ derivatives, while the left hand side simply depends on the ratio of driver Rd to the total interconnect resistance $R_{int}$ and the ratio of the receiver capacitance Cr to the total interconnect capacitance $C_{int}$. A database therefore can be constructed having a plurality of entries, in which each entry indicates an optimum combination of values for the variables related to each other in equation 7 or 7a. (A different database could be created instead in a different embodiment, using either a different approximation of Tpd or a different expression of the minimization function of eq. 2 or 3.)

The variables in the table include layout variables which can affect propagation delay of an interconnect, as well as at least one additional variable (such as interconnect length, driver resistance and receiver input capacitance) which also can affect propagation delay of an interconnect. The value combinations are chosen to optimize the propagation delay of an interconnect against fabrication process variations that can affect the value of at least one "subject" layout variable. Optimization of an interconnect against variations in the value of the subject variable then can be performed simply by searching the interconnect optimization database for a combination of values which best matches all the values indicated in the preliminary layout for the particular interconnect. For example, a best match row may be one in which the values of all variables but one match the values in the preliminary layout. If more than one row meets that criteria, for example if all values except the value of L matches one row and all values except the value of Rd matches another row, then external constraints may mandate choosing one over the other as the "best" match. If no such external constraints apply, then the "best" match row may be selected based on an order of priority regarding the variable to be adjusted. If no row contains values matching all but one in the preliminary layout, but one row contains values matching all but two in the preliminary layout, then that row may be considered the "best" match. Many alternative criteria will be apparent to the reader.

The interconnect optimization database can contain separate (physically or merely logically) sets of entries which optimize against process-induced variations in different ones of the layout variables. Alternatively or additionally, it can contain a set of entries which optimize against process-induced variations in two or more of the layout variables simultaneously. In an embodiment which supports zeroing of higher order differentials, entries can also include markings to indicate which combinations also satisfy the second order differential equation, the third order differential equation, and so on. Note that the database does not include all possible optimum combinations of values, at least because some variables (metal utilization, for example) are continuous in nature. For those variables, combinations are included for a number of discrete values. As used herein, the term "database" does not necessarily imply any unity of structure. For example, two or more separate databases, when considered together, still constitute a "database" as that term is used herein. In addition, in an embodiment described herein, the interconnect optimization database takes the form of a database "table". While a "table" is generally thought of as a two-dimensional database (rows and columns), it will be appreciated that a table could also be implemented in multiple dimensions, for example with each parameter occupying a different dimension. Object-oriented database structures can be used as well. Numerous variations for representing the databases described herein will be apparent to the reader.

In an embodiment, the interconnect optimization database used in step 416 takes the form of a database table and includes the following columns:

metal level ID (indicates nominal interconnect height h0)
nominal interconnect width w0
information about laterally adjacent wires, for example an effective spacing to the "nearer" wire on either side laterally, and an effective spacing to the wire on the opposite side. Wires beyond a predetermined distance away are considered to be at infinite distance. The term "effective" spacing is used here to accommodate recognition that often the nearest wire in one lateral direction does not extend the full length of the subject wire, and that another wire, more distant than the first wire, may be the nearest wire along part of the length of the subject wire. In this situation a consolidated "effective" spacing is calculated based on the length of subject wire exposed to different adjacent wires at different spacings.
metal utilization within a predetermined window covering the subject wire. This value is used together with the nominal interconnect width to determine a more likely actual interconnect width and height which can be expected given the target fabrication process. Note that while this value is likely more accurate, it does not preclude process caused uncertainty.

Information about nearby wires on other layers, for example the metal utilization percentage and optionally diagonal distance to center-of-gravity of the metal utilization, for each of up to two metal layers above and below the layer of the subject interconnect.

Possibly other fine tuning variables driver identity (indicates driver output resistance)

receiver identity (indicates receiver input capacitance)

optimum effective interconnect length L for the combination of values indicated above It can be seen that the variables indicated in the table include both layout variables which affect $c_{int}$ and/or $r_{int}$ (e.g. nominal interconnect height h0, nominal interconnect width w0, information about laterally adjacent wires, metal utilization near the subject interconnect, and information about wires on other layers), as well as additional variables (Rd, Cr and L), each of which can affect propagation delay of an interconnect.

Development of Interconnect Optimization Database

Figure 5:
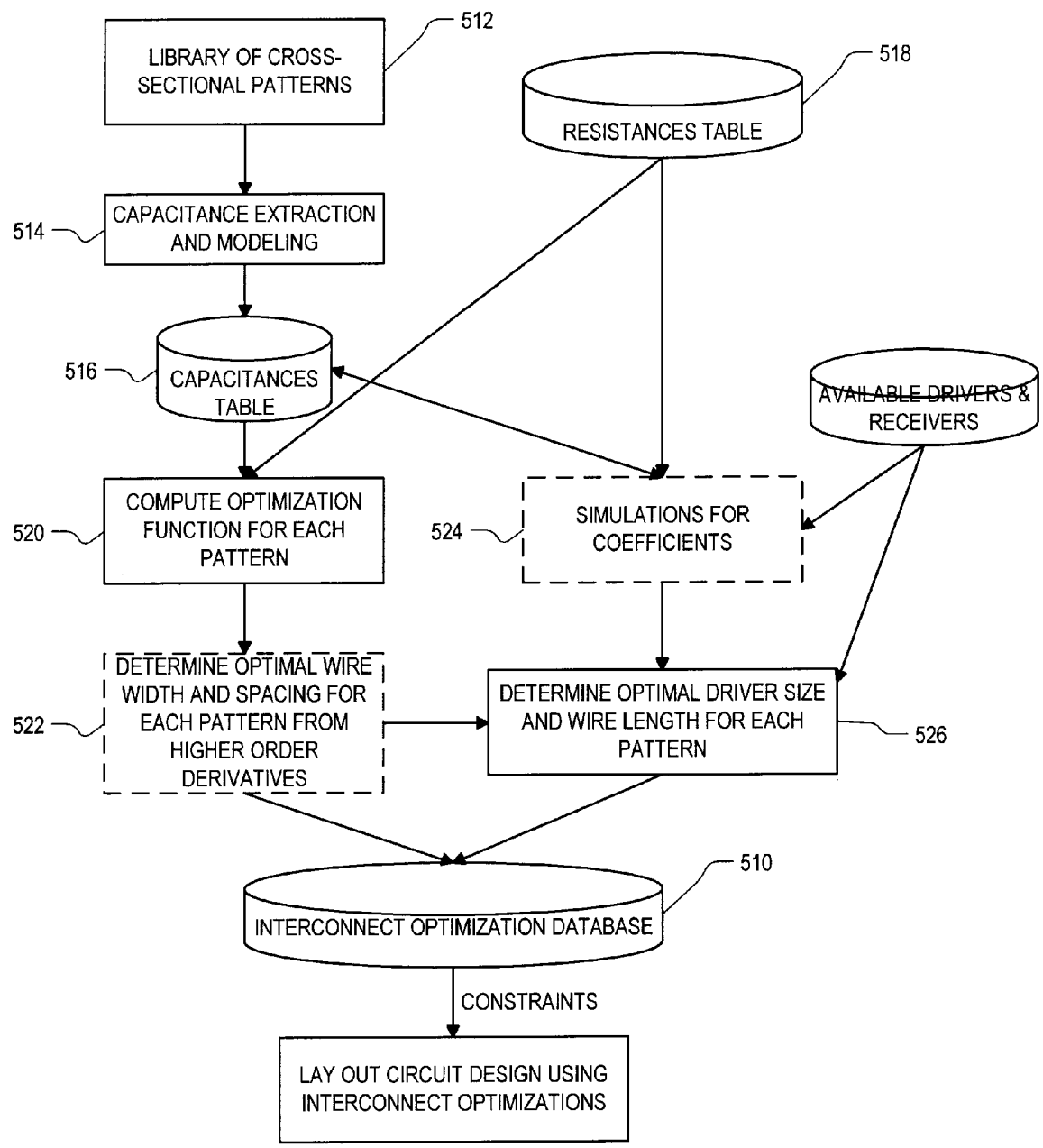

FIG. 5 is a flowchart of a method for developing the interconnect optimization database, indicated as 510 in FIG. 5. The routine begins with a library 512 of cross-sectional patterns. This is a large table indicating in the different rows numerous combinations of values for layout variables that can affect either or both of the per-unit-length interconnect values $c_{int}$ and $r_{int}$. The table does not at this point identify non-layout values, such as Rd and Cr, nor does it identify any interconnect lengths L. In one embodiment, the library of cross-sectional patterns contains the following columns:

Metal level ID

Width of wire (nominal)

Information about laterally adjacent wires, such as effective spacing to nearest adjacent wire on right (nominal) and effective spacing to nearest adjacent wire on left. As previously mentioned, wires beyond a predetermined distance are considered to be at infinite distance, and the term "effective" spacing is a composite value calculated based on the length of an interconnect that is exposed to different adjacent wires at different spacings. Note further that symmetries can halve the number of entries needed to cover all laterally adjacent wire possibilities. That is, an interconnect having a wire x nm distant on the right and another wire y nm distant on the left, has the same effect on capacitance per unit length as an interconnect having a wire y nm distant on the right and another wire x nm distant on the left. In an embodiment, therefore, the information about laterally adjacent wires is represented in one column indicating the effective spacing to the "nearer" wire on either side laterally, and a second column indicating the effective spacing to the wire on the opposite side, the latter spacing being always at least as great as the former.

Information about nearby wires on other layers, such as metal utilization on each layer above and below, and optionally diagonal distance to center-of-gravity of the metal utilization in that layer. Separate columns indicate the metal utilization and distance to center-of-gravity, for each metal layer other than the subject metal layer. In practice, typically it is sufficient to include only two metal layers below and above the subject metal layer.

Possibly other fine tuning variables

In step 514, the capacitance per unit length $C_{int}$ is calculated for each row in the table. The values $c_{int}$ determined here preferably are specific to the target fabrication process; if it is desired to support more than one fabrication process (or variations on one fabrication process), then the table can be duplicated and values can be determined for $c_{int}$ that are specific to each desired target fabrication process. Known tools can be used to determine values for $c_{int}$, such as the Raphael capacitance solver tool, or the Raphael NXT 3D random walk solver tool, both available from Synopsys, Inc.

The calculated values for $c_{int}$ are added in another column in the table. The resulting table, now called a Capacitances Table 516, now contains the following columns:

Metal level ID

Width of wire (nominal)

Information about laterally adjacent wires

Metal utilization within predetermined window covering the subject wire

Information about nearby wires on other layers

Possibly other fine tuning variables, and

The calculated $c_{int}$ for each row's cross-sectional pattern.

Also provided to the routine of FIG. 5 is a Resistances Table 518, which is another large table indicating in the different rows numerous combinations of values for layout variables that can affect the resistance per-unit-length $r_{int}$ of an interconnect. Resistances Table 518 contains the following columns:

Metal level ID (to establish nominal interconnect height h0)

Width of wire (nominal)

Pitch or spacing between laterally adjacent wires

Metal utilization within predetermined window covering the subject wire

Possibly other fine tuning variables

Resulting $r_{int}$ for an interconnect having the values above

Resistances Table 518 can be provided by the target fabrication facility or it can be modeled theoretically or determined empirically in much the same way that the capacitances $c_{int}$ were determined in step 514.

It can be seen that most of the columns in the Resistance Table 518 are also present in the Capacitances Table 516. A few columns are present in the Resistances Table that are not in the Capacitances Table 514 because they affect $r_{int}$ but not $c_{int}$. In one embodiment, at this point the Resistances Table 518 is joined into the Capacitances Table 516, with columns for all the variables in both tables, and with all combinations of values in both tables represented on different rows. The combined table also has columns to indicate both the resulting $c_{int}$ and the resulting $r_{int}$. In the embodiment of FIG. 5, however, the tables are not joined. Instead, they are kept separate and whenever the resistance and capacitance values $r_{int}$ and $c_{int}$ are needed for a particular geometric configuration, $r_{int}$ is obtained from the Resistances Table and $c_{int}$ is obtained from the Capacitances Table.

In step 520, the optimization function value is calculated for each row in the Capacitances Table 516. In the present embodiment, the optimization function is the right hand side of eq. 7a above. Separate function values are calculated for each desired optimization variable for which optimization is to be made available in the design process. For example, if the designer is to be provided with the ability to optimize the immunity of interconnect propagation delays against fabrication process variations which can affect the actual interconnect width w, then w is substituted for x and w0 for x0 in eq. 7a and the right hand side of the equation is calculated for each row in the table. The same is performed for other optimization parameters, such as actual interconnect height h, actual spacing s, and actual dielectric thickness td.

The right hand side of eq. 7a requires calculation of certain partial derivatives. In embodiments in which the parameter for optimization is a column in the table, the partial derivatives can be calculated for each row in the table from its nearby rows, using a well-known discrete numerical method in which all variables are held constant except that the desired parameter for optimization x is allowed to change. For different values of x, the value $r_{int}$ is extracted from the Resistances Table 518 and the value $c_{int}$ is extracted from the Capacitances Table 516. Additionally, if desired for a particular embodiment, the values of second and higher order partial derivatives can be calculated here as well, and added as still further columns in the table. At this point the Capacitances Table now contains the following columns:

- Metal level ID
- Width of wire (nominal)
- Information about laterally adjacent wires
- Metal utilization within predetermined window covering the subject wire
- Information about nearby wires on other layers
- Possibly other fine tuning variables
- The calculated $c_{int}$ for each row's cross-sectional pattern.
- The calculated $r_{int}$ for each row's cross-sectional pattern (this column might be in the Resistances Table 518 and not in the current version of the Capacitances Table, as previously mentioned)
- The calculated right-hand side of eq. 7a (separate columns for each desired derivative order and for each desired optimization parameter).

Step 522 is an optional step, performed only when higher derivative orders are to be supported. As previously mentioned, while solutions always exist when it is required to zero or minimize only the first order derivative of Tpd with respect to the optimization parameter x, solutions do not always exist when it is required to zero or minimize higher order derivatives. When they do exist, however, the particular combinations of values that satisfy the higher order derivative equation is a subset of those that satisfy the lower order derivative equations. The rows of the table that satisfy the higher order derivative equation therefore are even more preferred, for a particular optimization parameter, than the rows that satisfy only the lower order derivative equation. In this step, therefore, an attempt is made to qualify particular rows of the current table as being preferred (optimal) when optimizing the design for each particular parameter for optimization.

Using the second order formula of eq. 11a as an example, for each row in the current version of the Capacitances Table, the values indicated by that row for a particular desired optimization parameter x are inserted into eq. 11a. The values for $c_{int}$ already exist for each row in the Capacitances Table, and the values for $r_{int}$ are taken from Resistances Table 518. The second order partials needed to insert into eq. 11a were calculated in step 520. If eq. 11a is satisfied for a particular row, the table row is marked as "preferred when optimizing x". If not, then the row is not marked as "preferred when optimizing x".

This marking process can be generalized to support "order n" immunity from process variations for a particular optimization parameter x by replacing eq. 11a above with an equation that satisfies the n criteria of equation set 8, n>=1.

Note that step 522 will mark different rows as preferred for optimizing different ones of the available optimization parameters. Typically the choice of which adjustment parameter(s) are available to the designer for changing away from the original layout data, is constrained by other layout conditions such as routing track assignments, congestion, design rules, and so on. If the designer has the flexibility to immunize the design against variations in more than one of the optimization parameters, then as previously mentioned, cooperative optimization algorithms and criteria can be used.

At this point, if step 522 was performed, the Capacitances Table now contains the following columns:

- Metal level ID
- Width of wire (nominal)
- Information about laterally adjacent wires
- Metal utilization within predetermined window covering the subject wire
- Information about nearby wires on other layers
- Possibly other fine tuning variables
- The calculated $c_{int}$ for each row's cross-sectional pattern.
- The calculated $r_{int}$ for each row's cross-sectional pattern (this column might be in the Resistances Table 518 and not in the current version of the Capacitances Table, as previously mentioned)
- The calculated right-hand side of eq. 7a (separate columns for each desired derivative order and for each desired optimization parameter)
- Markings to indicate particular rows preferred in order to satisfy "order n" immunity from process variations for a particular optimization parameter x, for each desired derivative order for each parameter x.

It will be recalled that the approximate function set forth in eq. 4 for Tpd includes certain coefficients e1, e2, e3 and e4. Two coefficient ratios, e2/e4 and e3/e4 survive into eq. 7a. Ballpark values for the coefficients e1, e2, e3 and e4 are generally available from prior knowledge about a particular fabrication process, but if they are not, or if more accurate results are desired, then in step 524 the values are determined by simulation. Specifically, for each row in the Capacitances Table 516, the propagation delay Tpd is simulated for each of a variety of values for Cr, Rd and L. These data points are then fit to eq. 4 to calculate values for e1, e2, e3 and e4. The simulations can use a well-known analog circuit simulator such as SPICE. In addition, the values used for Cr and Rd in the simulations can be, but need not be, the same as the those of the individual driver types and receiver types available to the designer. Once values for e1, e2, e3 and e4 have been determined for a given row in the table, the ratios e2/e4 and e3/e4 are calculated and added as new columns in the Capacitances Table. After step 524, the Capacitances Table now contains the following columns:

- Metal level ID
- Width of wire (nominal)
- Information about laterally adjacent wires
- Metal utilization within predetermined window covering the subject wire
- Information about nearby wires on other layers
- Possibly other fine tuning variables
- The calculated $c_{int}$ for each row's cross-sectional pattern.
- The calculated $r_{int}$ for each row's cross-sectional pattern (this column might be in the Resistances Table 518 and not in the current version of the Capacitances Table, as previously mentioned)
- The calculated e2/e4 and e3/e4 for this row's cross-sectional pattern
- The calculated right-hand side of eq. 7a (separate columns for each desired derivative order and for each desired optimization parameter)
- Markings to indicate particular rows preferred in order to satisfy "order n" immunity from process variations for a particular optimization parameter x, for each desired derivative order for each parameter x.

In step 526, the optimal driver, receiver and wire length are determined for each row in the Table. In particular, each row in the current version of the Capacitances Table is first expanded to a number of rows for all combinations of (a) all individual available driver types and (b) all individual available receiver types. Columns are added for identifying the particular driver type and receiver type for the particular row. The list of individual drivers available to the designer (and their corresponding Rd) and the list of individual receivers available to the designer (and their corresponding Cr) are provided by the fabrication facility or by standard cell or IP library vendors. Using Rd and Cr for the particular driver type and receiver type for each row, and using the calculated values for e2/e4 and e3/e4, eq. 7a is then used to calculate an optimum interconnect length L, which is then added as a new column in the Table. After step 526, the Capacitances Table now contains the following columns:

Metal level ID
Width of wire (nominal)
Information about laterally adjacent wires
Metal utilization within predetermined window covering the subject wire
Information about nearby wires on other layers
Possibly other fine tuning variables
Optimum effective interconnect length L for the geometry, driver and receiver and fine tuning variables above
The calculated $c_{int}$ for each row's cross-sectional pattern.
The calculated $r_{int}$ for each row's cross-sectional pattern (this column might be in the Resistances Table 518 and not in the current version of the Capacitances Table, as previously mentioned)
The calculated e2/e4 and e3/e4 for this row's cross-sectional pattern
The calculated right-hand side of eq. 7a (separate columns for each desired derivative order and for each desired optimization parameter)
Markings to indicate particular rows preferred in order to satisfy "order n" immunity from process variations for a particular optimization parameter x, for each desired derivative order for each parameter x.

At this point the following columns can be deleted from the table as no longer necessary:

The calculated $c_{int}$ for each row's cross-sectional pattern.
The calculated $r_{int}$ for each row's cross-sectional pattern
The calculated right-hand side of eq. 7a (separate columns for each desired derivative order and for each desired optimization parameter)
The calculated e2/e4 and e3/e4 for this row's cross-sectional pattern.

The resulting table is that set forth above as the Interconnect Optimization Database 510. This table, among other things, now allows designer to find an optimum effective interconnect length L for each structural configuration of an interconnect and for a given driver/receiver pair. Conversely, if the effective L and receiver are fixed, the Interconnect Optimization Database 510 allows the designer to find the optimal driver. As yet another example, if the driver, receiver and wire length are fixed, the Interconnect Optimization Database 510 allows the designer to find the optimal nominal interconnect width w0 and spacing s0 or metal level.

It can be seen that in the Interconnect Optimization Database 510, the combination of values in each entry optimizes the propagation delay of an interconnect against fabrication process variations that can affect the value of at least one subject variable. As used herein, an "optimum" combination of values means the optimum given the constraints of the target fabrication process or design or layout rules. For example, as previously mentioned, if conductors are required to be located in pre-defined tracks, then this places a quantization constraint on the spacing between conductors. The "optimum" combination of values therefore might be different if this constraint were absent. Additionally, in order to accommodate optimization against fabrication process variations in more than one variable, the strictly optimal combination of values may be accompanied by several alternative combinations of values on either side which significantly reduce the impact on propagation delay of variations in the subject variable, though they might not be quite as effective as the strictly optimal combination of values. (The alternative combinations may be represented formulaically or with value ranges in the strictly optimal entry, rather than as separate entries.) These other combinations of values are nevertheless still considered herein to "optimize" the propagation delay of an interconnect against fabrication process variations in the value of the subject variable. It will also be appreciated that while true optimization is preferred, a benefit can be obtained even if the adjustment of adjustment variables merely improves the immunity of an interconnect's Tpd to process uncertainties, relative to the level of immunity in the original layout.

The Interconnect Optimization Database 510 is useful as a product in itself, for use in immunizing layouts against process variations, or it can be used directly in an immediately following step of optimizing a layout such as in FIG. 4.

System Implementations

Figure 6:
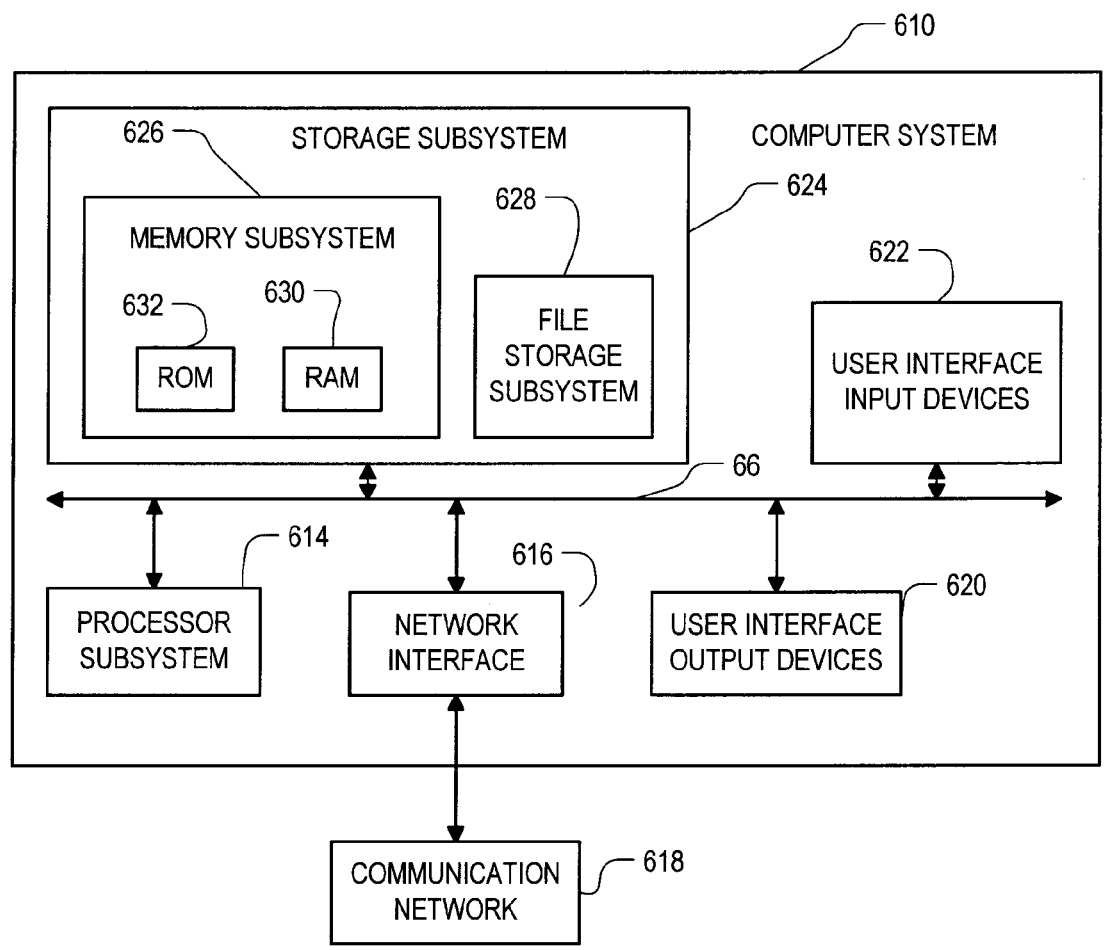
FIG. 6 is a simplified block diagram of a computer system implementing software incorporating aspects of the present invention.

FIG. 6 is a simplified block diagram of a computer system 610 that can be used to implement software incorporating aspects of the present invention. Computer system 610 typically includes a processor subsystem 614 which communicates with a number of peripheral devices via bus subsystem 612. These peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks, including an interface to communication network 618, and is coupled via communication network 618 to corresponding interface devices in other computer systems. Communication network 618 may comprise many interconnected computer systems and communication links. These communication links may be wireline links, optical links, wireless links, or any other mechanisms for communication of information. While in one embodiment, communication network 618 is the Internet, in other embodiments, communication network 618 may be any suitable computer network.

User interface input devices 622 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 610 or onto computer network 618.

User interface output devices 620 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 610 to the user or to another machine or computer system.

Storage subsystem 624 stores the basic programming and data constructs that provide the functionality of certain embodiments of the present invention. For example, the various modules implementing the functionality of FIGS. 4 and 5 herein may be stored in storage subsystem 624. These software modules are generally executed by processor subsystem 614.

Memory subsystem 626 typically includes a number of memories including a main random access memory (RAM) 630 for storage of instructions and data during program execution and a read only memory (ROM) 632 in which fixed instructions are stored. File storage subsystem 628 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 628. The host memory 626 contains, among other things, computer instructions which, when executed by the processor subsystem 614, cause the computer system to operate or perform functions as described herein. As used herein, processes and software that are said to run in or on "the host" or "the computer", execute on the processor subsystem 614 in response to computer instructions and data in the host memory subsystem 626 including any other local or remote storage for such instructions and data.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 itself can be of varying types including a personal computer, a portable computer, a workstation, a computer terminal, a network computer, a television, a mainframe, or any other data processing system or user device. Due to the ever changing nature of computers and networks, the description of computer system 610 depicted in FIG. 6 is intended only as a specific example for purposes of illustrating certain embodiments of the present invention. Many other configurations of computer system 610 are possible having more or less components than the computer system depicted in FIG. 6.

In one embodiment, the library 512 of cross-sectional patterns, the resistances table 518, and the interconnect optimization database 510 can be input from data stored in the storage subsystem 624. In other embodiments one or more of these can be input via the user interface input devices 622, for example in the form of a data stream. Similarly, in one embodiment, the output or outputs of the methods described herein, both intermediate and ultimate outputs, can be written into the storage subsystem 624, or output via the user interface output devices 620, or both.

It will be understood that the present invention may be practiced as a method or device adapted to practice the method. The invention also may be viewed as a system which incorporates mechanisms such as software instructions which, when applied to a processing subsystem, perform the methods described herein. The invention may also be viewed as an article of manufacture such as media impressed with logic to carry out the methods described herein, or a signal stream impressed with such logic.

While the present invention has been described in the context of a fully functioning data processing system, those of ordinary skill in the art will appreciate that the processes described herein, for example those described above with respect to FIGS. 4 and 5, are capable of being distributed in the form of a computer readable medium of instructions and data and that the invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. A single computer readable medium, as the term is used herein, may also include more than one physical item, such as a plurality of CD-ROMs or a plurality of segments of RAM, or a combination of several different kinds of media.

In addition, it will be appreciated that the databases described herein, including one or more of the library 512 of cross-sectional patterns, the resistances table 518, the Interconnect Optimization Database 510, as well as the intermediate versions of databases developed during the operation of FIG. 5, can all be written, stored and/or distributed in the form of a computer readable medium as just described.

As used herein, two conductors, or metal layers, are considered "adjacent" to each other if there is no other conductor, or metal layer, in between. The term does not require that the two conductors or layers be touching each other.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value.

"Dependency" of a given signal, event or value upon another signal, event or value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for developing an interconnect optimization database, for use in laying out a circuit design for fabrication using a subject fabrication process, comprising the steps of:
   developing the database, the database including a plurality of entries; and
   writing the database into a non-transitory computer readable medium,
   wherein each of the plurality of entries in the database indicates a respective combination of values for:
   a plurality of layout variables each of which can affect propagation delay of an interconnect,
   and a set of at least one additional variable each of which can affect propagation delay of an interconnect,
   wherein the combination of values in each entry in the plurality of entries optimizes the propagation delay of an interconnect against fabrication process variations that can affect the value of at least a subject layout variable.

2. A method according to claim 1, wherein the plurality of layout variables includes layout variables which affect interconnect capacitance per unit length, and layout variables which affect interconnect resistance per unit length.

3. A method according to claim 1, wherein the plurality of layout variables includes at least two members of the group consisting of:
   interconnect conductor height;
   interconnect conductor width; and
   spacing to nearest laterally adjacent conductor in the same layer as the interconnect.

4. A method according to claim 3, wherein the plurality of layout variables further includes a member of the group consisting of:
   metal utilization in the same layer as the interconnect; and
   metal utilization in a metal layer adjacent to that of the interconnect.

5. A method according to claim 3, wherein the plurality of layout variables includes interconnect conductor height,
   and wherein the value of the interconnect conductor height variable is specified in the database by identifying a particular one of a plurality of available metal layers in which the interconnect can be located.

6. A method according to claim 1, wherein the set of additional variables includes at least one member of the group consisting of:
   interconnect length;
   output resistance of a driver driving the interconnect; and
   input capacitance of a receiver connected to the interconnect.

7. A method according to claim 1, wherein the set of additional variables includes:
   interconnect length;
   output resistance of a driver driving the interconnect; and
   input capacitance of a receiver connected to the interconnect.

8. A method according to claim 1, wherein the subject variable is one of the layout variables.

9. A method according to claim 1, wherein the plurality of layout variables includes interconnect conductor height and interconnect conductor width,
   and wherein the subject variable is a member of the group consisting of interconnect conductor height, interconnect conductor width, and spacing to nearest laterally adjacent conductor in the same layer as the interconnect.

10. A method according to claim 1, further comprising the steps of:
    providing a preliminary layout for an integrated circuit design, the preliminary layout including, for a subject interconnect in the circuit design, an indication of values for each of the variables indicated in an entry of the database;
    adjusting the value for an adjustment one of the variables in dependence upon the interconnect optimization database; and
    developing a revised layout in dependence upon the adjusted value for the adjustment variable.

11. A method according to claim 10, further comprising the step of providing information dependent on the revised layout to a facility for fabrication of an integrated circuit in dependence upon the information.

12. A system for developing an interconnect optimization database, for use in laying out a circuit design for fabrication using a subject fabrication process, comprising:
    a memory; and
    a data processor coupled to the memory, the data processor configured to develop the database and write the database into a non-transitory computer readable medium,
    wherein the database includes a plurality of entries, each indicating a respective combination of values for:
    a plurality of layout variables each of which can affect propagation delay of an interconnect, and
    a set of at least one additional variable each of which can affect propagation delay of an interconnect,
    wherein the combination of values in each entry in the plurality of entries optimizes the propagation delay of an interconnect against fabrication process variations that can affect the value of at least a subject layout variable.

13. A method for developing an interconnect optimization database, for use in laying out a circuit design for fabrication using a subject fabrication process, comprising the steps of:
    providing a preliminary database containing a preliminary plurality of entries, each entry in the preliminary plurality indicating a respective combination of values for a plurality of layout each of which can affect propagation delay of an interconnect;
    for each subject entry in the preliminary plurality, determining a respective set of at least one combination of values for at least one of a set of additional variables each of which can affect propagation delay of an interconnect, the combinations of additional values determined for each particular one of the entries optimizing the immunity of interconnect propagation delays against fabrication process variations which can affect the value of at least a subject one of the layout variables or the additional variables;
    developing an interconnect optimization database which indicates, for each entry in the preliminary plurality, the set of value combinations determined for the additional variables; and
    writing the interconnect optimization database into a non-transitory computer readable medium.

14. A method according to claim 13, wherein the plurality of layout variables includes at least two members of the group consisting of:
    interconnect conductor height;
    interconnect conductor width;
    spacing to nearest laterally adjacent conductor in the same layer as the interconnect;
    metal utilization in the same layer as the interconnect; and
    metal utilization in a metal layer adjacent to that of the interconnect.

15. A method according to claim 13, wherein the plurality of additional variables includes at least one member of the group consisting of:
  interconnect length;
  output resistance of a driver driving the interconnect; and
  input capacitance of a receiver connected to the interconnect.

16. A method according to claim 13, wherein the subject variable is one of the layout variables.

17. A method according to claim 13, wherein the subject variable is one of the layout variables,
  and wherein the step of determining a respective set of at least one combination of values for at least one of a set of additional variables comprises the step of choosing values for the additional variables for which:
  the magnitude of $\partial Tpd/\partial x|_{x=x_0}$ is a minimum,
  where Tpd is an approximate formula for the propagation delay of the interconnect, as a function of variables including at least a subset of the layout variables,
  x is the subject variable, and
  x0 is the value for the subject variable as indicated in the subject entry of the preliminary database.

18. A method according to claim 17, wherein the plurality of layout variables includes variables which affect the capacitance per unit length $c_{int}$ of the interconnect and variables which affect the resistance per unit length $r_{int}$ of the interconnect,
  and wherein the set of additional variables includes an output resistance Rd of a driver driving the interconnect, an input capacitance Cr of a receiver connected to the interconnect, and an interconnect length L,
  and wherein Tpd is given by:

$$Tpd = e1 \cdot Rd \cdot Cr + e2 \cdot Rd \cdot c_{int} \cdot L + e3 \cdot r_{int} \cdot Cr \cdot L + e4 \cdot r_{int} \cdot c_{int} \cdot L^2,$$

where e1, e2, e3 and e4 are coefficients.

19. A method according to claim 13, wherein the subject variable is one of the layout variables,
  wherein the plurality of layout variables includes variables which affect the capacitance per unit length $c_{int}$ of the interconnect and variables which affect the resistance per unit length $r_{int}$ of the interconnect,
  and wherein the set of additional variables includes an output resistance Rd of a driver driving the interconnect, an input capacitance Cr of a receiver connected to the interconnect, and an interconnect length L,
  and wherein the step of determining a respective set of at least one combination of values for at least one of a set of additional variables comprises the step of choosing values for the additional variables for which:

$$\frac{(e2/e4) \cdot (Rd/L) + r_{int}}{(e3/e4) \cdot (Cr/L) + c_{int}} = -\frac{\partial r_{int}/\partial x}{\partial c_{int}/\partial x},$$

where x is the subject variable, and
  e1, e2, e3 and e4 are coefficients.

20. A method according to claim 13, wherein the subject variable is one of the layout variables,
  wherein the plurality of layout variables includes variables which affect the capacitance per unit length $c_{int}$ of the interconnect and variables which affect the resistance per unit length $r_{int}$ of the interconnect,
  and wherein the set of additional variables includes an output resistance Rd of a driver driving the interconnect, an input capacitance Cr of a receiver connected to the interconnect, and an interconnect length L,
  and wherein the step of determining a respective set of at least one combination of values for at least one of a set of additional variables comprises the step of choosing values for the additional variables for which:

$$\frac{(e2/e4) \cdot (Rd/R_{int}) + 1}{(e3/e4) \cdot (Cr/C_{int}) + 1} = -\frac{\partial \ln(r_{int})/\partial x}{\partial \ln(c_{int})/\partial x},$$

where x is the subject variable, and
  e1, e2, e3 and e4 are coefficients.

21. A method according to claim 13, wherein the subject variable is one of the layout variables,
  wherein the plurality of layout variables includes variables which affect the capacitance per unit length $c_{int}$ of the interconnect and variables which affect the resistance per unit length $r_{int}$ of the interconnect,
  and wherein the set of additional variables includes an output resistance Rd of a driver driving the interconnect, an input capacitance Cr of a receiver connected to the interconnect, and an interconnect length L,
  and wherein the step of determining a respective set of at least one combination of values for at least one of a set of additional variables comprises the step of choosing values for the additional variables for which:

$$\partial Tpd/\partial x|_{x=x_0} = 0, \partial^2 Tpd/\partial x^2|_{x=x_0} = 0, \ldots, \text{and } \partial^n Tpd/\partial x^n|_{x=x_0} = 0,$$

where n is an integer greater than 1,
  where Tpd is an approximate formula for the propagation delay of the interconnect, as a function of variables including at least a subset of the layout variables,
  x is the subject variable, and
  x0 is the value for the subject variable as indicated in the subject entry of the preliminary database.

22. A method according to claim 13, further comprising the steps of:
  providing a preliminary layout for an integrated circuit design, the preliminary layout including, for a subject interconnect in the circuit design, an indication of values for each of the variables indicated in an entry of the interconnect optimization database;
  adjusting the value for an adjustment one of the variables, in dependence upon the interconnect optimization database; and
  developing a revised layout in dependence upon the adjusted value for the subject variable.

23. A non-transitory computer readable medium, the medium having an interconnect optimization database therein which includes a plurality of entries, wherein each of the plurality of entries in the database indicates a respective combination of values for:
  a plurality of layout variables each of which can affect propagation delay of an interconnect,
  and a set of at least one additional variable each of which can affect propagation delay of an interconnect,
  wherein the combination of values in each entry in the plurality of entries optimizes the propagation delay of an interconnect against fabrication process variations that can affect the value of at least a subject layout variable.

24. A medium according to claim 23, wherein the plurality of layout variables includes at least two members of the group consisting of:
   interconnect conductor height;
   interconnect conductor width; and
   spacing to nearest laterally adjacent conductor in the same layer as the interconnect.

25. A medium according to claim 24, wherein the plurality of layout variables further includes a member of the group consisting of:
   metal utilization in the same layer as the interconnect; and
   metal utilization in a metal layer adjacent to that of the interconnect.

26. A medium according to claim 25, wherein the set of additional variables includes interconnect length.

27. A medium according to claim 26, wherein the set of additional variables further includes:
   output resistance of a driver driving the interconnect; and
   input capacitance of a receiver connected to the interconnect.

28. A medium according to claim 24, wherein the plurality of layout variables includes interconnect conductor height and interconnect conductor width,
   and wherein the subject variable is a member of the group consisting of interconnect conductor height, interconnect conductor width, and spacing to nearest laterally adjacent conductor in the same layer as the interconnect.

* * * * *